US008880234B2

(12) United States Patent
Sekoguchi et al.

(10) Patent No.: US 8,880,234 B2
(45) Date of Patent: Nov. 4, 2014

(54) SUPERVISORY CONTROL METHOD AND EQUIPMENT FOR SMART GRIDS

(75) Inventors: Masahiro Sekoguchi, Hitachi (JP); Chihiro Fukui, Hitachinaka (JP); Tetsuo Yamada, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 628 days.

(21) Appl. No.: 13/190,666

(22) Filed: Jul. 26, 2011

(65) Prior Publication Data
US 2012/0029716 A1 Feb. 2, 2012

(30) Foreign Application Priority Data

Jul. 29, 2010 (JP) ................................. 2010-170013

(51) Int. Cl.
G05D 3/12 (2006.01)
G05D 5/00 (2006.01)
G05D 9/00 (2006.01)
G05D 11/00 (2006.01)
G05D 17/00 (2006.01)
H02J 3/38 (2006.01)

(52) U.S. Cl.
CPC ............. H02J 3/38 (2013.01); *H02J 2003/388* (2013.01)
USPC ........... 700/296; 700/286; 700/292; 700/293; 700/298

(58) Field of Classification Search
CPC .......... H02J 3/38; H02J 2003/388; G06F 1/30
USPC ............... 700/286–287, 291–298; 702/60–62
See application file for complete search history.

(56) References Cited

U.S. PATENT DOCUMENTS

| 8,478,452 | B2 * | 7/2013 | Pratt et al. | 700/297 |
| 8,504,214 | B2 * | 8/2013 | Genc et al. | 700/292 |
| 8,509,953 | B2 * | 8/2013 | Taft | 700/286 |
| 8,639,392 | B2 * | 1/2014 | Chassin | 700/291 |
| 2011/0012603 | A1 * | 1/2011 | Bose et al. | 324/418 |
| 2011/0231028 | A1 * | 9/2011 | Ozog | 700/291 |

(Continued)

FOREIGN PATENT DOCUMENTS

| CN | 101777769 | 7/2010 |
| JP | 07-163065 | 6/1995 |

(Continued)

OTHER PUBLICATIONS

Office Action issued in connection with corresponding Chinese Application, mailed Jun. 20, 2013, with English language translation thereof.
Office Action issued in connection with corresponding Japanese Application No. 2010-170013, mailed Nov. 19, 2013.

*Primary Examiner* — Ramesh Patel
(74) *Attorney, Agent, or Firm* — Antonelli, Terry, Stout & Kraus, LLP

(57) ABSTRACT

Supervisory control equipment for smart grids provided with a plurality of generators and loads and operated in interconnection with a commercial power system through an interconnected circuit breaker, comprising a frequency control ability calculation part for calculating the frequency control ability of the interconnected system by using a total power demand and a bus bar frequency; and an islanding and interconnection detection part for calculating frequency control ability of the commercial power system according to the frequency control ability of the system of the frequency control ability calculation part to discriminate between the interconnected and islanding operations according to the magnitude of the frequency control ability.

13 Claims, 9 Drawing Sheets

(56) References Cited

U.S. PATENT DOCUMENTS

| | | | |
|---|---|---|---|
| 2011/0254557 A1* | 10/2011 | Makki et al. | 324/418 |
| 2012/0010830 A1* | 1/2012 | Saarinen et al. | 702/58 |
| 2012/0029720 A1* | 2/2012 | Cherian et al. | 700/297 |
| 2013/0166085 A1* | 6/2013 | Cherian et al. | 700/291 |
| 2013/0187454 A1* | 7/2013 | Timbus et al. | 307/23 |
| 2013/0289782 A1* | 10/2013 | Giroti | 700/286 |

FOREIGN PATENT DOCUMENTS

| | | |
|---|---|---|
| JP | 08-065898 | 3/1996 |
| JP | 09-322409 | 12/1997 |
| JP | 10-248168 | 9/1998 |
| JP | 2002-199591 | 7/2002 |
| JP | 2002-281673 | 9/2002 |
| JP | 3367371 | 11/2002 |

* cited by examiner

SUPERVISORY CONTROL METHOD AND EQUIPMENT FOR SMART GRIDS

BACKGROUND OF THE INVENTION

The present invention relates to a supervisory control method and equipment for smart grids, which comprise diesel generators, gas turbine generators and distributed power sources using natural energy, to realize a stable operation by integrated and autonomous control of the distributed power sources in case of a load change or an accident.

The smart grid utilizes the latest digital information and communications technology to realize a power supply network that carries out interconnected management and operation efficiently by unifying information on various centralized power sources (such as hydraulic, thermal and nuclear power generations), power distribution networks and distributed power sources (such as solar power generation, wind-power generation, and diesel generator) with consumers (offices, factories, and ordinary homes). The smart grid network can monitor and control the flow of electricity and can also flow electricity and information bidirectionally between the power generating plants and the consumers.

In order to do that, it is considered that it is also necessary to perform independent operation for stabilization of voltage and frequency by the smart grid itself without relying on the commercial power system for compensation of the load change in the future, and it is also considered that the stand-alone operation of the distributed power sources is significant to enhance the independence of the distributed power sources from the commercial power system.

The smart grids dispersedly arranged close to the above consumer regions are attracting attention as smart grids serving as a complement to the existing large-scale power source, and it is necessary to interconnect them to the existing commercial power system in order to fully exert the role.

When the smart grid connected to the commercial power system falls in an islanding operation including other general consumer loads due to a power line or distribution line accident, it is required to parallel off the other general consumer loads from the distribution system as soon as possible from viewpoints of power supply reliability and maintenance. Here, the islanding operation means a state that power is supplied continuously by the smart grid only even if the power supply from the large-scale power source stops.

Therefore, various islanding operation detection devices have been developed and put into practical use for detection of the islanding operation of the smart grid. The islanding operation detection devices are largely classified into a passive type and an active type.

The islanding operation detection device of the passive type keeps supervising a measurable state quantity such as voltage and frequency variations, variations in high-frequency distortion and a phase shift at an interconnection of the distributed power sources, and detects the islanding operation through the use of a fact that the above values are variable largely in comparison with the ordinary interconnected power system state when the operation falls in the islanding operation. For example, JP-A 2002-281673 occasionally has a change in output frequency of the generator when the islanding operation occurs and then detects the islanding operation when the frequency change rate becomes a threshold value or more.

The islanding operation detection device according to the active type keeps applying disturbance from the smart grid side to the power system and monitors system phenomena of voltage and frequency when the islanding power system occurs and detects the islanding operation early. Japanese Patent No. 3367371 introduces interharmonics which are not in the commercial power system and detects system impedance at the time of abnormalities to detect the islanding operation state. But, the active type has the power capacitor constantly connected to the power system, and if power system noise such as a flicker load is large, it causes unnecessary operation, so that it is necessary to conduct an investigation such as prior measurement.

SUMMARY OF THE INVENTION

In a case where the smart grid is configured by interconnecting privately owned electrical power facilities which are comprised of many distributed power sources, it is necessary to interconnect to the existing commercial power system to operate the distributed power sources efficiently and economically.

It is basically determined that this linkage operation has a base load bone by the distributed power sources and the load exceeding the base load bone by the commercial power system. That is, the distributed power sources are continuously operated at a constant load to secure the amount of electric power generation which is worth the base load, and the load exceeding the base load is made to meet the demands of the whole smart grids by the whole distributed power sources by adjusting the quantity of electricity receiving from the commercial power system depending on the load variation.

The above operation means that an adjusting function for compensation of voltage and frequency variations involved in load changes is highly demanded from a viewpoint of the commercial power system, and there is a fear that the burden on the commercial power system increases furthermore in the future when the distributed power sources spread more widely.

Therefore, it is considered necessary to stabilize the voltage and frequency by the distributed power sources themselves without relying on the commercial power system to compensate for the load changes in the future, and it is also considered significant to conduct the stand-alone operation of the distributed power sources in order to enhance the independence of the distributed power sources from the commercial power system. In Europe, there is already announced the Standard for Interconnecting Distributed Resources with Electric Power Systems that demands the distributed power sources have a frequency control function.

Under the above-described circumstances, it is indispensable to develop a supervisory control method that the frequency control of the distributed power sources in the smart grid can be performed stably and efficiently in cooperation with the commercial power system. And, the present invention provides a supervisory control method and equipment for smart grinds effective and appropriate to realize the above.

The present invention provides a supervisory control method for smart grids which comprise a plurality of generators and loads and are operated in interconnection with a commercial power system, comprising calculating frequency control ability of the commercial power system; and discriminating between an interconnection operation and an islanding operation according to the magnitude of the frequency control ability.

When it is discriminated that the commercial power system is interconnected with the smart grids, a generator governor-free operation capacity in the smart grids is adjusted according to the frequency control ability of the commercial power system.

And, the commercial power system and the smart grid are compared for the frequency control ability, and the generator governor-free operation capacity in the smart grid is adjusted to conform the frequency control ability of the smart grid to the frequency control ability of the commercial power system.

When it is discriminated that the smart grid is in the islanding operation, the governor-free operation capacity is determined according to a permissible frequency variation of the smart grid.

When it is discriminated according to a change in the frequency control ability of the commercial power system that the smart grid is in the islanding operation, an open instruction is given to a circuit breaker interconnected between the commercial power system and the smart grid.

When it is discriminated according to the change in the frequency control ability of the commercial power system that the smart grid is in the islanding operation and the discriminated result of an active type islanding operation determination unit matches, the open instruction is given to the circuit breaker interconnected between the commercial power system and the smart grid.

The frequency control ability is calculated as a ratio between a time-series standard deviation of a system load short cyclic variation and a time-series standard deviation of a system frequency short cyclic variation.

The frequency control ability for discriminating between the interconnection and islanding operations according to the magnitude of the frequency control ability is determined to be frequency control ability of the system that the commercial power system and the smart grids are interconnected.

The present invention provides supervisory control equipment for smart grids provided with a plurality of generators and loads and operated in interconnection with a commercial power system through an interconnected circuit breaker, comprising a frequency control ability calculation part for calculating the frequency control ability of the interconnected system by using a total power demand and a bus bar frequency; and an islanding and interconnection detection part for calculating frequency control ability of the commercial power system according to the frequency control ability of the system of the frequency control ability calculation part to discriminate between the interconnected and islanding operations according to the magnitude of the frequency control ability.

A cooperated operation control part is also disposed to adjust the generator governor-free operation capacity in the smart grids according to the frequency control ability of the commercial power system when it is discriminated as an interconnected operation by the islanding and interconnection detection part.

The islanding and interconnection detection part calculates the frequency control ability of the commercial power system and the smart grids, and the cooperated operation control part adjusts the generator governor-free operation capacity in the smart grids to conform the frequency control ability of the smart grid to the frequency control ability of the commercial power system.

An islanding operation control part is also disposed to determine the governor-free operation capacity according to a permissible frequency variation of the smart grids when it is discriminated as an islanding operation by the islanding and interconnection detection part.

A control part for interconnected circuit breaker is also disposed to give an open instruction to the interconnected circuit breaker between the commercial power system and the smart grids when it is discriminated as an islanding operation by the islanding and interconnection detection part.

The control part for interconnected circuit breaker gives an open instruction to the interconnected circuit breaker between the commercial power system and the smart grids when it is discriminated as the islanding operation by the islanding and interconnection detection part and the discriminated result of an active type islanding operation determination unit matches.

The frequency control ability calculation part calculates the frequency control ability as a ratio between a time-series standard deviation of a system load short cyclic variation and a time-series standard deviation of a system frequency short cyclic variation.

According to the present invention, when the smart grid is interconnected with the commercial power system, the frequency control ability matching the system capacity can be expected, so that the distributed power source is not demanded to have the frequency control ability and energy storage function more than necessary. And, the commercial power system is not demanded to have a high ancillary function. Therefore, interconnection with the distributed power source becomes possible without forcedly imposing a substantial burden on the commercial power system, a change in the power generation by the distributed power source using natural energy such as solar power or wind power can also be compensated, and the independence and reliability of the distributed power source can be enhanced adequately.

Other objects, features and advantages of the invention will become apparent from the following description of the embodiments of the invention taken in conjunction with the accompanying drawings.

DESCRIPTION OF THE EMBODIMENTS

Modes for carrying out the present invention are described below with reference to the drawings.

Figure 1:
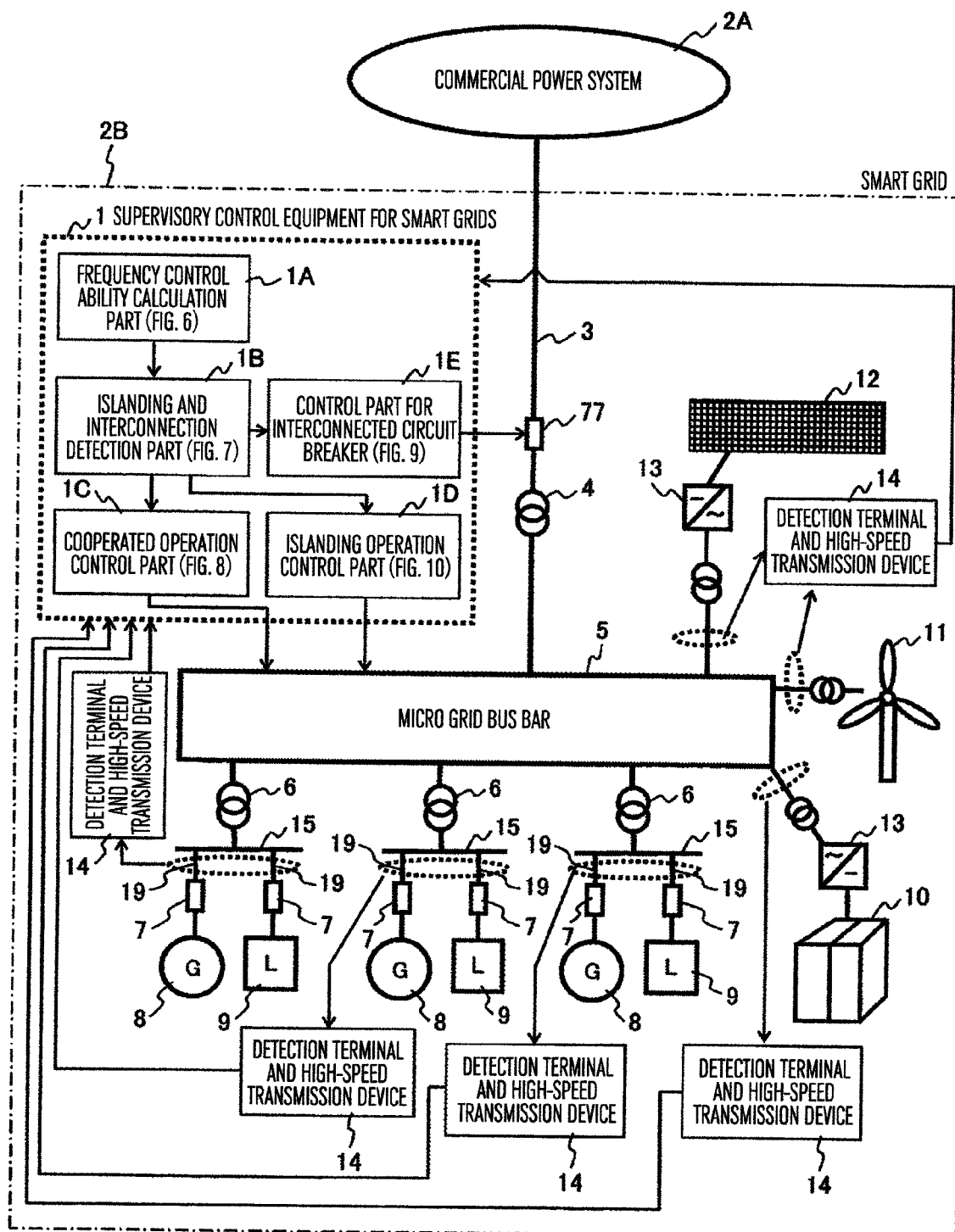
FIG. 1 is a diagram showing a whole structure of a smart grid and its supervisory control equipment.

FIG. 1 shows a whole structure of a power system configuring a smart grid and its supervisory control equipment 1.

The power system configuring a smart grid 2B is described. The smart grid 2B has a smart grid bus bar 5, which can be connected to a commercial power system 2A through an interconnected transformer 4, an interconnected circuit breaker 77, and an interconnected transmission line 3. As the smart grid bus bar 5, a loop structure, a mesh structure or a radial structure is conceived, but FIG. 1 shows an example of the loop structure.

The smart grid bus bar 5 is connected with plural power sources and loads. As the power sources, for example, plural generators 8 are disposed and connected to the smart grid bus bar 5 through a circuit breaker 7, a generator bus bar 15, and a generator transformer 6. And loads 9 are connected to the generator bus bars 15 through a circuit breaker 7 and a transmission line 19.

Generally, the smart grid system 2B comprises the above plural generators 8, generator transformers 6, loads 9, etc., but there may be also disposed, as the power sources, an energy storage unit 10, an AC-DC converter 13, a wind power generating plant 11, photovoltaic generation equipment 12 and the like.

The power system configuring the smart grid is generally as described above, and this supervisory control equipment 1 continuously takes the states of the power sources (the generators 8, the energy storage unit 10, the AC-DC converter 13, the wind power generating plant 11, the photovoltaic generation equipment 12, etc.) configuring the power system, the supply power and the loads at the loads 9 through detection terminal and high-speed transmission devices 14. And, the supervisory control equipment 1 orders activation or stop to the plural generators 8 in the smart grid system 2B and also gives an output change command value and a control mode command value to them.

The ordinary large-scale power system takes them macroscopically as total generated power and total load and can reflect them to control the power system, but since the supervisory control equipment 1 for smart grids is small in scale, it is characterized by taking the states of the supply power and the load at the individual generators 8 and the individual loads 9.

The supervisory control equipment 1 for smart grids comprises a frequency control calculation part 1A, an islanding and interconnection detection part 1B, a cooperated operation control part 1C, an islanding operation control part 1D, and a control part 1E for interconnected circuit breaker, and their details are described later with reference to the drawings.

Figure 2:
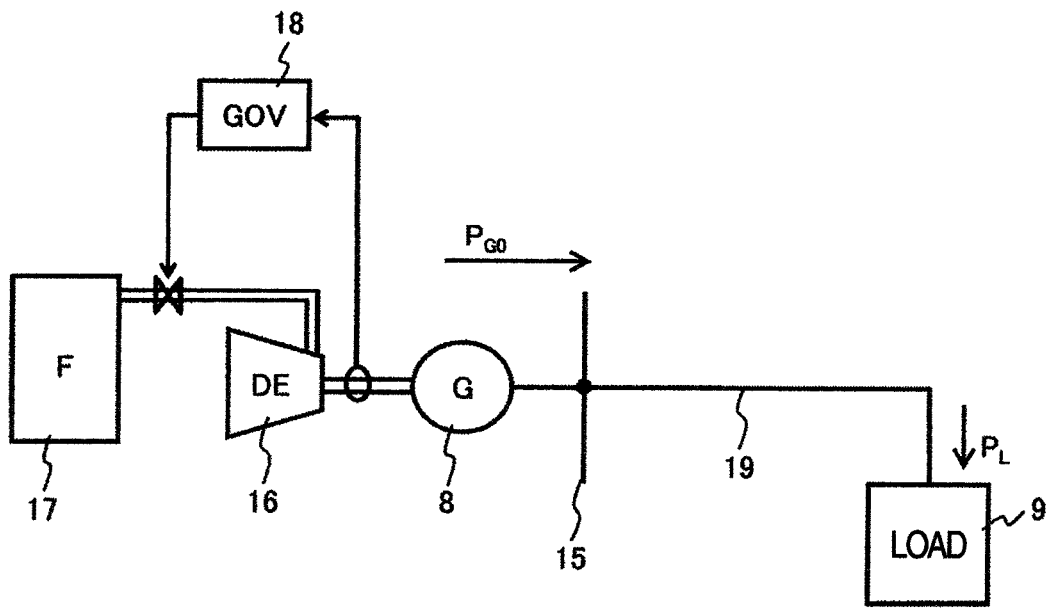
FIG. 2 is a diagram schematically showing a relationship between generated electric power and load in the smart grid.

FIG. 2 is a diagram schematically showing, as a sole model, a relationship between generated power $P_{GO}$ and load $P_L$ in the smart grid. The generated power $P_{GO}$ is determined by controlling the fuel amount from a fuel tank 17 provided to a prime mover 16 mechanically connected to the generator 8 by a speed governor 18. The load 9 is electrically connected to the generator through the power line 19 and the bus bar 15, and the magnitude of load $P_L$ is determined depending on the circumstances on the side of the load.

The speed governor 18 controls the number of rotations of the generator 8 and, therefore, the frequency of the power system at a constant level. When the output $P_{GO}$ of the generator 8 and the magnitude $P_L$ of the load 9 are equal, power demand and supply are balanced, and the frequency is kept at a rated value.

But, if the load 9 varies to become unbalance from the generator output, the frequency varies. The frequency rises when the output of the generator 8 becomes excessively large in comparison with the magnitude of the load. Conversely, if the generator output becomes insufficient in comparison with the magnitude of the load, the frequency lowers. Then, the speed governor 18 detects the unbalance between the supply and the demand from the frequency of the generator and controls the fuel from the fuel tank 17 or the like to give to the prime mover 16. When the frequency increases, the fuel from the fuel tank 17 is decreased to decelerate the prime mover 16, and when the frequency decreases, the fuel from the fuel tank 17 is increased to accelerate the prime mover 16.

The relationship described above with reference to FIG. 2 is a relationship which is also true for the general commercial power system other than the smart grid. But, the frequency control ability is required to be high to resume the stable state and to keep it if the frequency is varied due to the occurrence of the power supply-demand unbalance. Therefore, it is necessary to put the frequency control ability into numbers to know it and to evaluate constantly.

Putting the frequency control ability into numbers to know it is described below with reference to numerical expressions. The frequency control ability can be finally put into numbers from the relationship of expression (9) or expression (10). This conclusion is derived from a motion equation (1) of the power system provided by the power demand and supply of FIG. 2. When a frequency variation phenomenon is concerned, the term related to the phase angle oscillation of the system generator can be neglected, and it is only necessary to consider the generator inertia.

$$M\frac{df}{dt} + D(\Delta f)\cdot \Delta f + \mu(\Delta f) = \Delta P \quad (1)$$

Here, M represents a generator inertia constant, D(f) represents a load frequency characteristic function, Δf represents a frequency deviation, and μ(f) represents a frequency characteristic function of the speed governor.

Laplace transformation of the expression (1) results in expression (2). But, s represents Laplace operator.

$$\frac{\Delta f(s)}{\Delta P(s)} = \frac{1}{M\cdot s + D(s) + \mu(s)} \quad (2)$$

The term D(s) of the load frequency characteristic function and the term μ(s) of the frequency characteristic function of the speed governor are expressed by expressions (3) and (4).

$$D(s) = \frac{K_L}{1+T_L s} \quad (3)$$

$$\mu(s) = \frac{K_G}{1+T_G s} \quad (4)$$

Here, $K_L$ represents a load frequency characteristic constant (per unit system capacity), $T_L$ represents a load frequency characteristic time constant, $K_G$ represents a generator frequency characteristic constant (per unit system capacity), and $T_G$ represents a generator frequency characteristic time constant.

Numerical expression of the frequency control ability is calculation of specific numerical values of the frequency characteristic constants configuring the expressions (3) and (4), and determination of the specific numerical values is described below.

Figure 3:
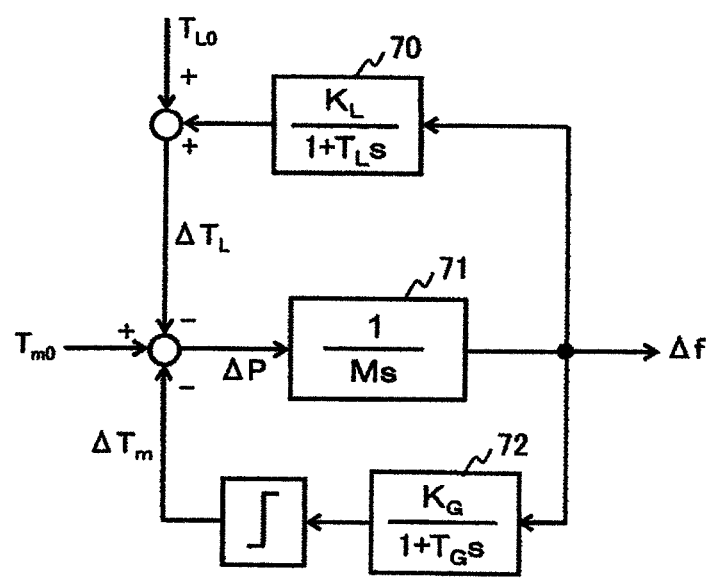
FIG. 3 is a diagram showing FIG. 2 as a transfer function model under equivalent frequency control.

FIG. 3 shows the electric circuit model of FIG. 2 as a transfer function model under equivalent frequency control. In FIG. 3, 70 represents a frequency characteristic model of the load 9 expressed by the expression (3), 71 represents an inertia model of the generator 8, and 72 represents a frequency characteristic model of the generator 8 expressed by the expression (4).

In very simple terms, this transfer function model indicates that in a state of initial value $T_{L0}$ of electromagnetic torque and initial value $T_{m0}$ of mechanical torque of the prime mover 16 given to the generator 8, electrical output difference ΔP is integrated under inertia M of the generator 8 to appear as generator angular velocity Δω, the result is given to the frequency characteristic model 72 of the generator 8 represented by a primary delay circuit and the frequency characteristic model 70 of the load 9, and finally returned as the electric output to the initial value $T_{m0}$ of mechanical torque of the prime mover 16 and the initial value $T_{L0}$ of electromagnetic torque. Therefore, the frequency is stabilized constant when the mechanical input $T_{m0}$ and the electric output match mutually in this circuit.

Incidentally, the load has a characteristic that the electric power consumption increases when the frequency rises and decreases when the frequency falls. This characteristic is called a load frequency characteristic. The change of the power consumption is substantially different depending on the load, and for example, a synchronous motor load is directly influenced by a frequency change, but an induction motor load is less influenced by the frequency change because it has a cushion which is called a slip. And, electric light and electric heater loads are substantially free from being influenced by the frequency change. In addition, an AC-DC converter to be disposed in combination with the photovoltaic generation equipment and the wind-power generation plant can be treated as the loads. Therefore, the overall characteristic is determined depending on a ratio of the existing loads.

And, a change of power-generating capacity with respect to the frequency change includes the inertia of the generator, the synchronizing power generated by a phase difference between the generators, an output change due to a speed governor operation, etc. Among them, what is to be considered in a steady state is limited to the output change due to the speed governor operation.

When a randomly-generated load change is expressed by numerical expressions, a statistical frequency variation Δfi(s) in the steady state becomes approximately as follows. When it is assumed that a random load change ΔPi(s) is the total sum of many step-like variations of the load, Laplace transformation of the frequency variation corresponding to the step change of an i-th load ΔPi is expressed by expression (5).

$$\Delta fi(s) = \frac{1}{M \cdot s + D(s) + \mu(s)} \cdot \frac{\Delta Pi}{s} \quad (5)$$

In the expression (5), frequency Δfi in the steady state can be expressed by expression (6) according to the final value theorem.

$$\Delta fi = \lim_{t \to \infty} fi(t) = \lim_{s \to 0} sfi(s) = \frac{\Delta Pi}{K_L + K_G} \quad (6)$$

In addition, when a frequency change standard deviation is represented by σΔf on the basis of adequately large N-number of frequency observed data, expression (7) is obtained.

$$\sigma_{\Delta f}^2 = \frac{1}{N-1} \sum_{i=1}^{N} (\Delta fi - \Delta \overline{fi})^2 \quad (7)$$

When the standard deviation of a load change is represented by σΔP, expression (8) can be obtained from the expression (6).

$$\sigma_{\Delta f}^2 = \frac{1}{(K_L + K_G)^2} \cdot \frac{1}{N-1} \sum_{i=1}^{N} (\Delta Pi - \Delta \overline{Pi})^2 = \frac{1}{(K_L + K_G)^2} \cdot \sigma_{\Delta P}^2 \quad (8)$$

Therefore, there is established a relationship of expression (9) between the standard deviation σΔf of the frequency variation and the standard deviation σΔP of the load change.

$$\sigma_{\Delta f} = \frac{1}{(K_L + K_G)} \cdot \sigma_{\Delta P} \quad (9)$$

Figure 4:
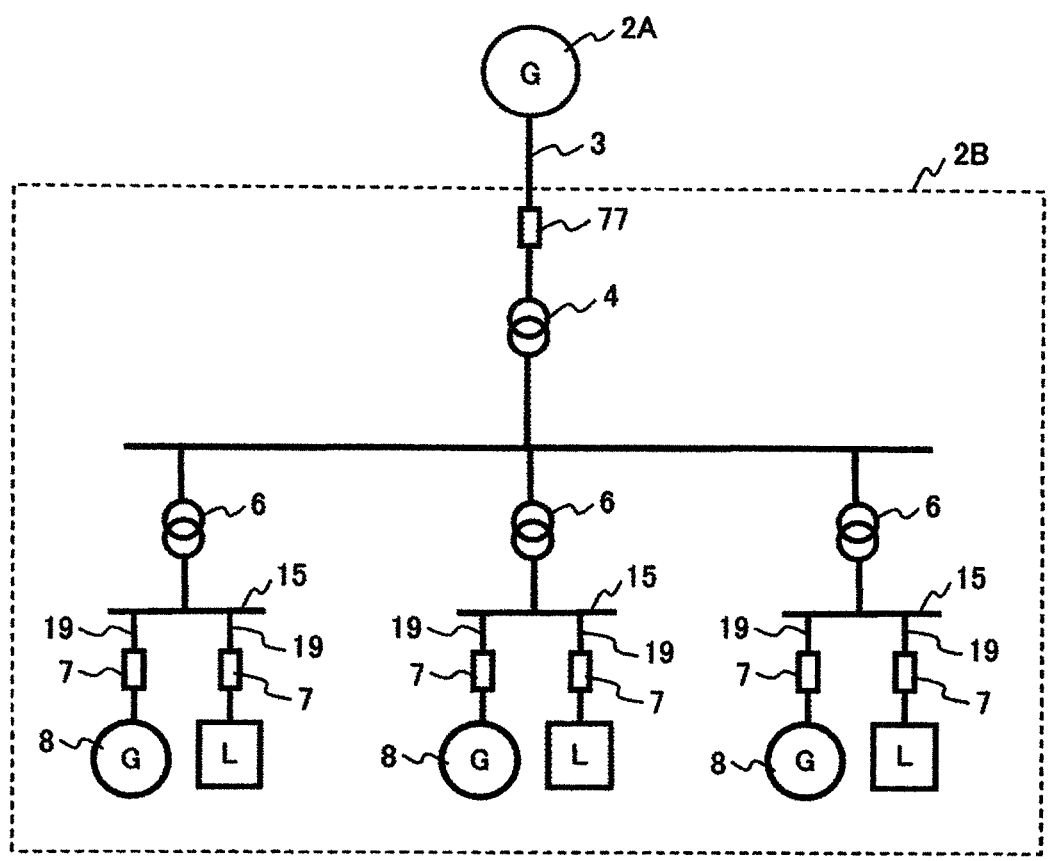
FIG. 4 is a diagram showing a power system that interconnects a commercial power system and a smart grid.

Description using the above numerical expressions relates to the smart grid 2B represented by the model system of FIG. 2, but the smart grid 2B is occasionally used in a state interconnected to the commercial power system 2A as shown in FIG. 4. The above-described relationship of the expression (9) is also established when this interconnect power system is configured.

When the smart grid 2B and the commercial power system 2A are interconnected as shown in FIG. 4, the commercial power system 2A is considered to be a generator having a large capacity, so that there is established a relationship of expression (10) between a frequency variation standard deviation σΔf2 and the load change standard deviation σΔP.

$$\sigma_{\Delta f2} = \frac{1}{(K_{LS} + K_{GS})P_{GS} + (K_{LC} + K_{GC})P_{GC}} \cdot \sigma_{\Delta P} \quad (10)$$

Here, $K_{LS}$ represents a load frequency characteristic constant (per unit system capacity) in smart grid, $K_{GS}$ represents generator frequency characteristic constant (per unit system capacity) in smart grid, $P_{GS}$ represents the total sum of generator rated capacities in smart grid, $K_{LC}$ represents a load frequency characteristic constant (per unit system capacity) in commercial power system, $K_{GC}$ represents a generator frequency characteristic constant (per unit system capacity) in commercial power system, and $P_{GC}$ represents the total sum of generator rated capacities in commercial power system.

The present invention finally determines the expressions (9) and (10). The expression (9) is a relationship established when the smart grid 2B of FIG. 1 performs the islanding operation, and the expression (10) is a relationship established when the smart grid 2B and the commercial power system 2A are interconnected in FIG. 1. In these expressions, the frequency variation standard deviation σΔf or σΔf2 and the load change standard deviation σΔP are values which can be derived from the measured frequency or load data of the power system. Therefore, the values of constant parts of the expressions (9) and (10) are obtained as a ratio of the measured values, and the obtained numerical value are grasped as the evaluation numerical value of the frequency control ability.

Using the above-described relationship, the generator control in the smart grid 2B in the cooperated operation that the smart grid 2B and the commercial power system 2A are interconnected and used, the generator control in the islanding operation, and the circuit breaker control at the time of shifting from the cooperated operation to the islanding operation are described below sequentially with reference to embodiments of FIG. 5, FIG. 9 and FIG. 10.

The supervisory control equipment 1 for smart grids of the embodiments of the individual drawings is comprised of, for example, a digital computer and normally provided with the frequency control ability calculation part 1A and the governor-free generator setting part 1B as functions to use the above-described relationships. In addition, the supervisory control equipment 1 is independently provided with the cooperated operation control part 1C in FIG. 5, the islanding operation control part 1D in FIG. 9, and the control part 1E for interconnected circuit breaker in FIG. 10.

Figure 5:
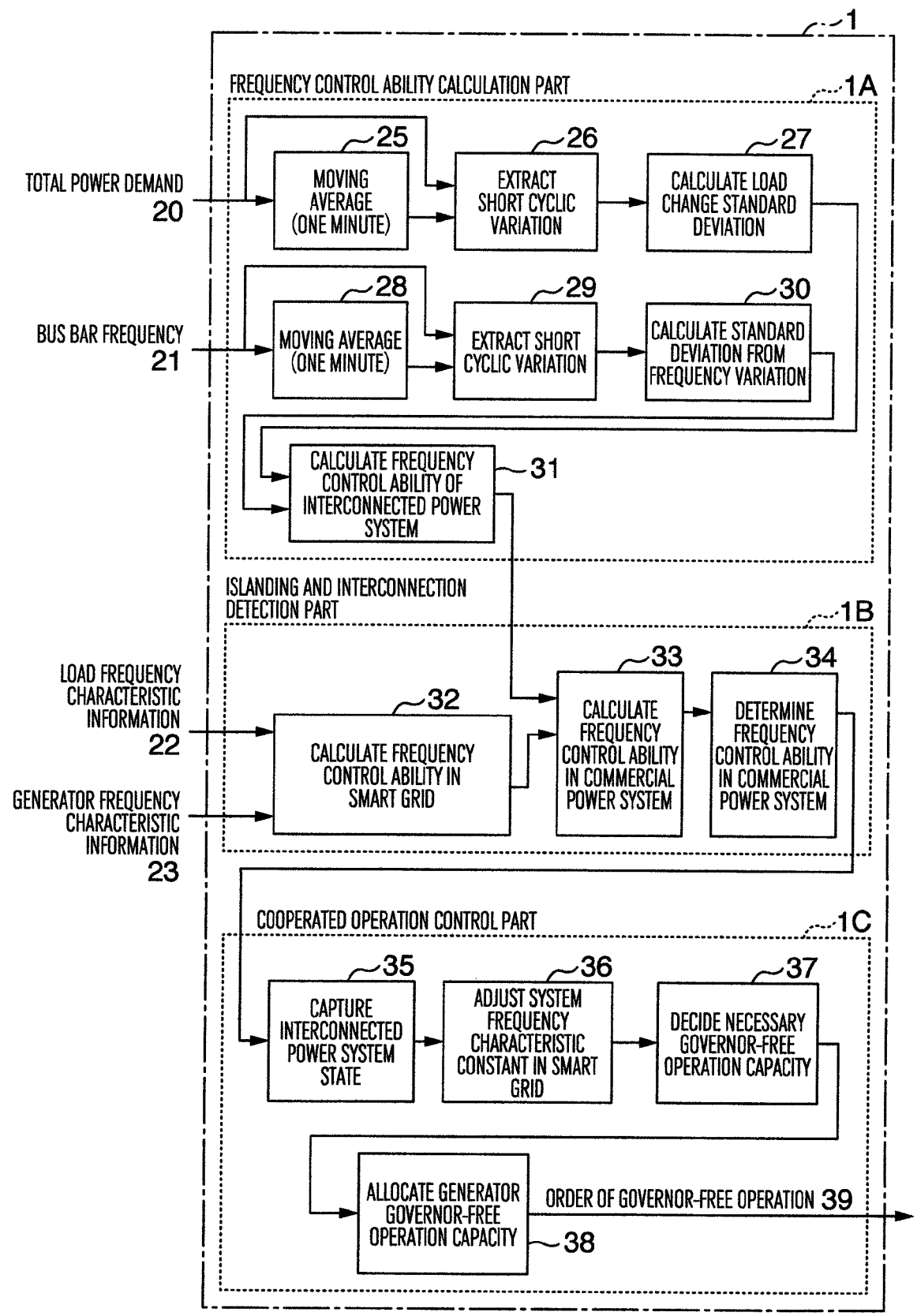
FIG. 5 is a diagram showing 1A, 1B and 1C of supervisory control equipment for smart grids.

FIG. 5 is a block diagram showing the functions 1A, 1B and 1C of the supervisory control equipment 1 for smart grids. Here, the generator control in the smart grid 2B in the cooperated operation that the smart grid 2B is used in interconnection with the commercial power system 2A is described. FIG. 5 includes the frequency control ability calculation part 1A and the governor-free generator setting part 1B as the standard functions, and the cooperated operation control part 1C as an individual function.

To perform the above series of processing, the supervisory control equipment 1 for smart grids determines the generated power of all power sources inside and outside the smart grid 2B of FIG. 1 at one-second periods for example, and inputs a total power demand 20 as a total value of the individual periods. And, a (smart grid) bus bar frequency is determined at one-second periods for example, and input as a bus bar frequency 21. The generated power of the power source in the smart grid 2B can be obtained from the detection terminal and high-speed transmission device 14 of FIG. 1, but the total generated power of the power sources outside the smart grid 2B may be obtained from, for example, a central power supply command station or the like that executes supervisory control of the commercial power system.

The frequency control ability calculation part 1A as the standard function inputs the total power demand 20 at one-second periods and determines, for example, a moving average value in one minute by a moving average processing part 25 every time that the input is performed. Then, a difference between the total power demand 20 and the moving average value is determined by an extraction part 26 of short cyclic variation to extract a load short cyclic variation. In addition, this load short cyclic variation is input, a calculation part 27 of load change standard deviation takes out the load short cyclic variation for every one minute, and calculates a standard deviation from the plural load short cyclic variations. Thus calculated load change standard deviation corresponds to the load change standard deviation $\sigma\Delta P$ of the expressions (9) and (10).

Processing based on the same concept is also performed on the bus bar frequency 21. That is, the output of a moving average processing part 28 having the bus bar frequency 21 as input is subtracted as a base, and the frequency short cyclic variation is extracted by an extraction part 29 of frequency short cyclic variation. In addition, the frequency short cyclic variation is input, and a calculation part 30 of standard deviation takes out the frequency short cyclic variation for every one minute and calculates the frequency change standard deviation. The frequency change standard deviation calculated as described above corresponds to the frequency change standard deviation $\sigma\Delta f$ or $\sigma\Delta f2$ of the expression (9) or (10).

A calculation part 31 of system frequency characteristic in interconnected power system calculates a system frequency characteristic constant, namely frequency control ability, with the smart grid interconnected with the commercial power system, by dividing the load change standard variation $\sigma\Delta P$ by the frequency change standard deviation $\sigma\Delta f2$. Thus determined numerical value is the constant part of the expression (10).

Action of the islanding and interconnection detection part 1B is described below. One input is frequency control ability at the time of linkage operation determined by the calculation part 31 of system frequency characteristic and the constant part of the expression (10). The other input is frequency control ability at the smart grid islanding operation.

The frequency control ability at the time of smart grid islanding operation can be determined by two methods. One of them prepares by previously calculating as design data because the smart grid 2B is a low power system, and the other uses data of the frequency control ability obtained from the data input at the time of smart grid islanding operation for a subsequent operation. In FIG. 5, a calculation part 32 of frequency control ability in smart grid within the islanding and interconnection detection part 1B calculates the frequency characteristic constant of a single smart grid based on design data 22 and 23 of the load frequency characteristic constant and the generator frequency characteristic constant in the smart grid. To obtain data of the frequency control ability from the data input at the time of smart grid islanding operation, the processing of the frequency control ability calculation part 1A can be used.

A calculation part 33 of frequency control ability in interconnected commercial power system subtracts the output of the calculation part 32 of frequency control ability in smart grid from the output of the calculation part 31 of system frequency control ability in interconnected power system. The frequency control ability of the commercial power system is calculated according to the above result. It means that only constant parts (term established by $K_{LC}$, $K_{GC}$ and $P_{GC}$) of the frequency control ability of the commercial power system are extracted from the constant parts of the expression (10) (output of the calculation part 33 of frequency control ability in interconnected commercial power system) excepting the constant part (term established by $K_{LS}$, $K_{GS}$ and $P_{GS}$) in smart grid.

The thus obtained frequency control ability of the commercial power system is variable depending on the change of facilities such as power plants and loads or a failure of the power system, but the former was scheduled in advance and normally within a predetermined range of values. Therefore, a determination part 34 of frequency control ability in interconnected commercial power system can compare the frequency control ability of the commercial power system with a reference value to judge as linkage operation. In other words, the frequency control ability is lost if the commercial power system has a failure, and the value changes largely from the value at the normal time. The present invention catches the above change and discriminates that the interconnected operation has shifted to the islanding operation.

The above description was made on a case that the frequency control ability of the commercial power system is taken and compared with the reference value. But, the output of the calculation part 31 of system frequency control ability in interconnected power system may be monitored to discriminate according to the change that the interconnected operation was shifted to the islanding operation. The judgment using the frequency control ability is made by the passive type.

When the judgment by the determination part 34 of frequency control ability in interconnected commercial power system is the linkage operation, the cooperated operation control part 1C takes in the conditions by a capture part 35 of interconnected power system state and starts the following processing. The operation performed by the cooperated operation control part 1C is described very briefly. That is, the frequency control ability of the smart grid at the linkage operation is kept at the same level as that of the frequency control ability of the commercial power system. In other words, compensation for the load change is performed without relying on the commercial power system, and control directed to an independent operation of stabilizing the voltage and frequency is performed by the smart grid itself.

For the above control, first, the frequency characteristic constant in smart grid is adjusted by an adjusting part 36 of system frequency characteristic constant in smart grid. Specifically, if there is a deviation between a system frequency characteristic constant at the time of linkage operation with the commercial power system and the frequency characteristic constant of the single smart grid, the frequency characteristic constant in smart grid is matched with the interconnected system frequency characteristic constant. Thus, output sharing between the commercial power system and the single smart grid is defined.

Then, a calculation part 37 of necessary governor-free operation capacity decides necessary governor-free operation capacity in smart grid according to the output of the adjusting part 36 of system frequency characteristic constant in smart grid. In addition, a generator frequency characteristic constant $K_{GS}$ in smart grid is adjusted to realize a necessary frequency characteristic constant.

An allocation part 38 of generator governor-free operation capacity decides an addition or reduction of a governor-free operation generator according to the necessary governor-free operation capacity.

Through the above-described decision by the cooperated operation control part 1C, the generator in smart grid is demanded to have more output sharing, and the governor-free operation capacity is adjusted so that the generator can also respond independently to the frequency variation.

Conforming the frequency control ability of the smart grid at the linkage operation to the frequency control ability of the commercial power system means that the independent operation can be continued even when the smart grid islanding operation is performed due to separation from the commercial power system.

Figure 6:
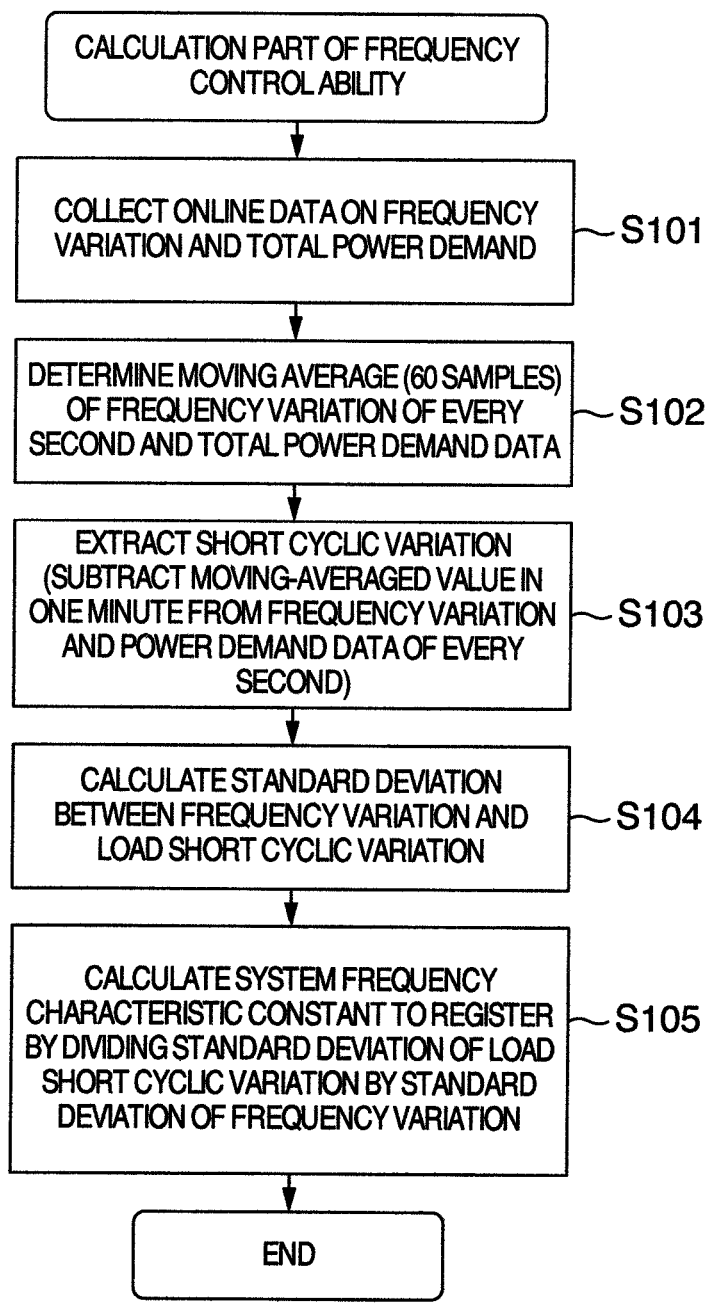
FIG. 6 is a flow chart showing frequency control ability calculation processing 1A.

In the circuit of FIG. 5, the frequency control ability calculation part 1A is described in detail with reference to the flow chart of FIG. 6. First, online data on frequency variation in smart grid and the total power demand is collected in Step S101. Then, about 60 samples of a one-second interval frequency and power demand data are determined as moving average data of about one minute in Step S102. In addition, a short cyclic variation is extracted by subtracting the moving-averaged power demand data from the one-second interval frequency and power demand data in Step S103. The standard deviation between the frequency variation and the load short cyclic variation is calculated in Step S104. The standard deviation between the frequency variation and the load short cyclic variation is calculated, and system frequency characteristic constant (KL+KG) is calculated in Step S105. That is, the system frequency characteristic constant is calculated and registered by dividing the standard deviation of the load short cyclic variation by the standard deviation of the short cyclic variation of frequency variation.

Figure 7:
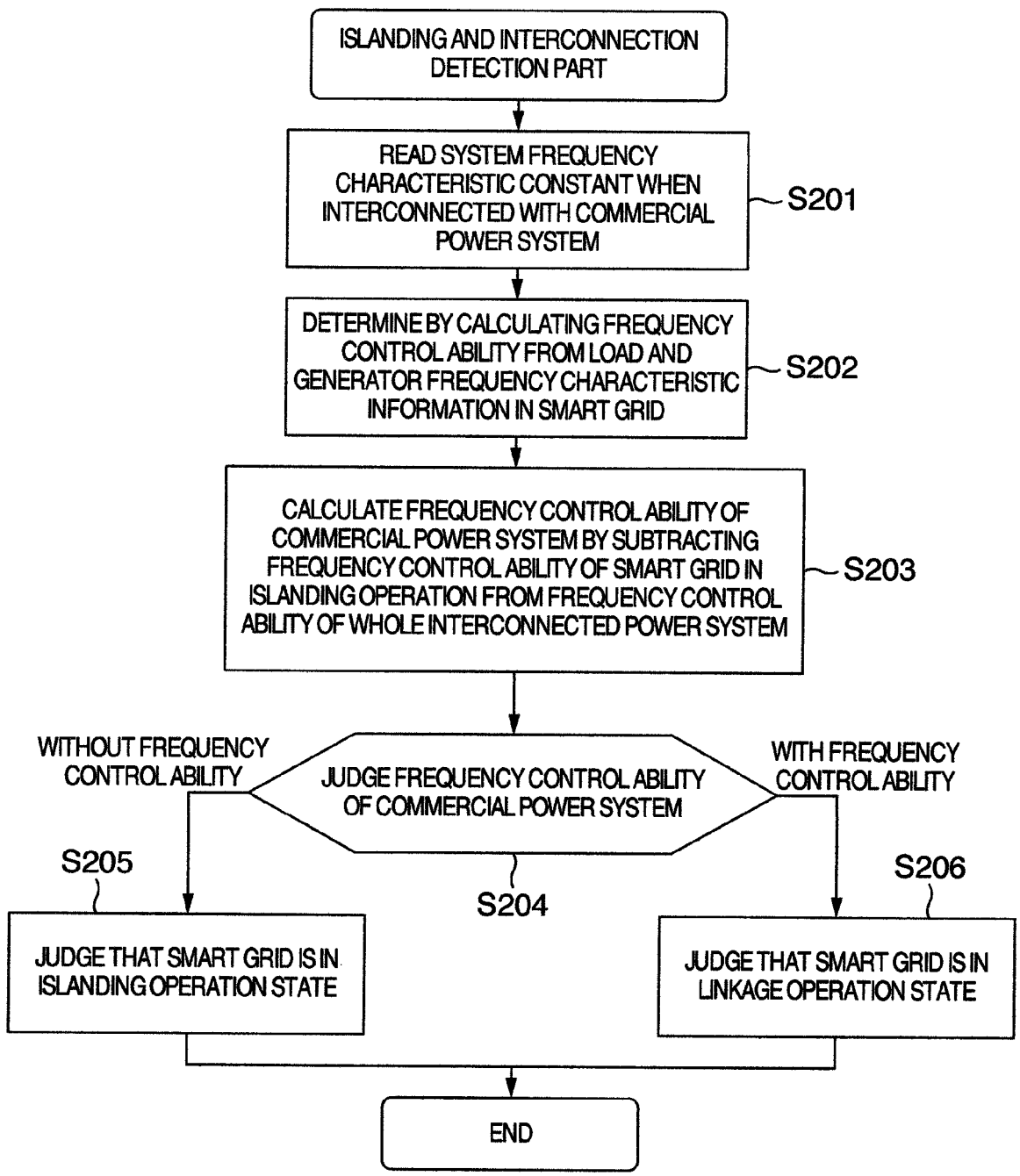
FIG. 7 is a flow chart showing islanding and interconnection detection processing 1B.

The islanding and interconnection detection part 1B in the circuit of FIG. 5 is described in detail with reference to the flow chart of FIG. 7. First, the system frequency characteristic constant at the time of interconnection with the commercial power system is read in Step S201. Then, frequency control ability is determined by calculating from the load and generator frequency characteristic information in smart grid in Step S202. In Step S203, the frequency control ability of the commercial power system is calculated by subtracting the frequency control ability of smart grid in islanding operation from the frequency control ability of the whole interconnected power system. The frequency control ability of the commercial power system is judged in Step S204. When the judged result indicates no frequency control ability, it is judged in Step S205 that the smart grid is in the islanding operation state. When the judged result indicates that the commercial power system has frequency control ability, it is judged that the smart grid is in the linkage operation state. The frequency control ability of the commercial power system lowers due to a failure within the power system, but since the ability is variable depending on a failed position, a type of failure or the like, the judgment in Step S205 is desirably confirmed and decided with an appropriate threshold value.

Figure 8:
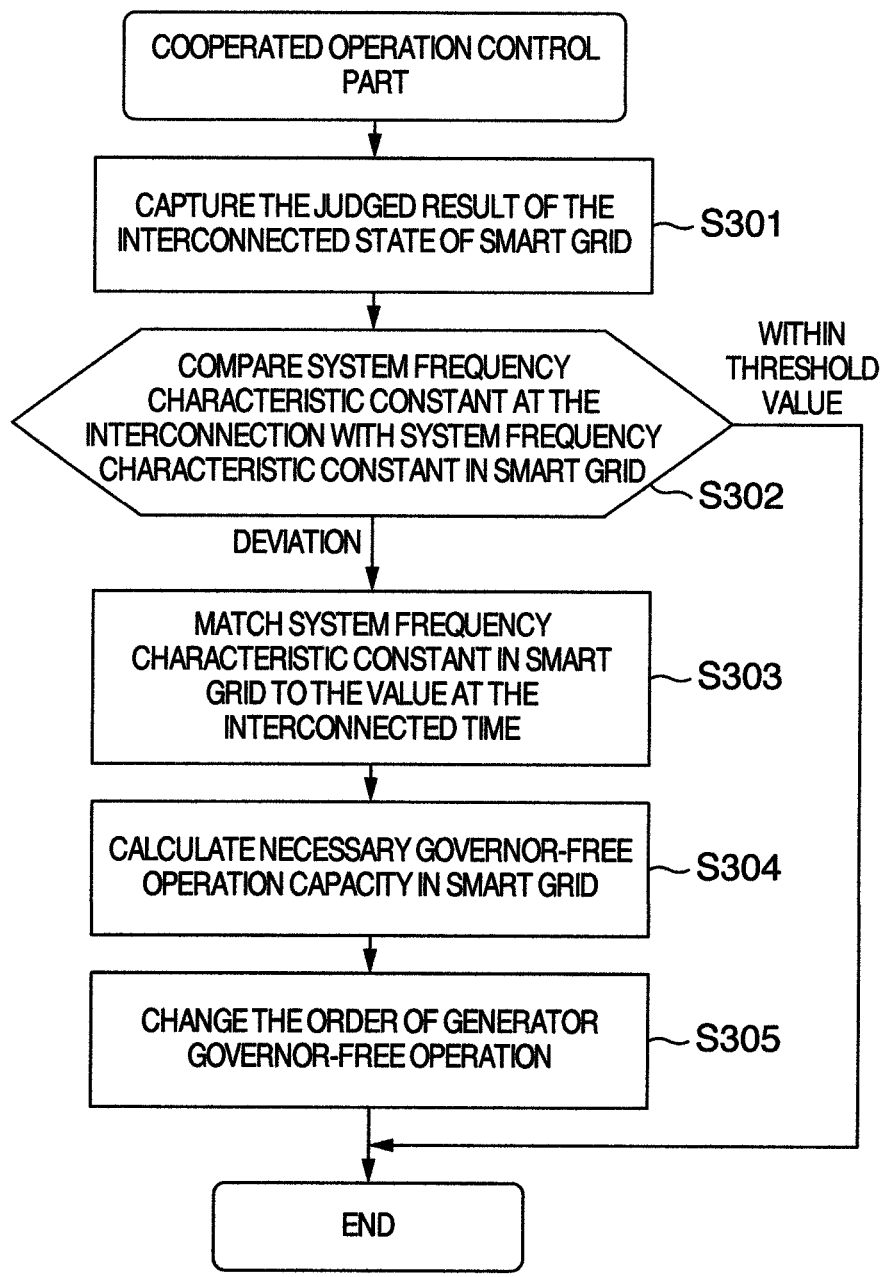
FIG. 8 is a flow chart showing cooperated operation control processing 1C.

The cooperated operation control part 1C in the circuit of FIG. 5 is described in detail below with reference to the flow chart of FIG. 8. First, the judged result of the interconnected state of the smart grid is taken in Step S301. The system frequency characteristic constant at the time of interconnection is compared with the system frequency characteristic constant in smart grid in Step S302. If the compared result indicates no deviation, the processing is terminated. If the system frequency characteristic constant at the time of interconnection and the system frequency characteristic constant in smart grid had deviation between them, the system characteristic constant in smart grid is matched to the value at the interconnected time in Step S303. Necessary governor-free operation capacity in smart grid is calculated in Step S304, and a subject to the order of generator governor-free operation is changed in Step S305.

Figure 9:
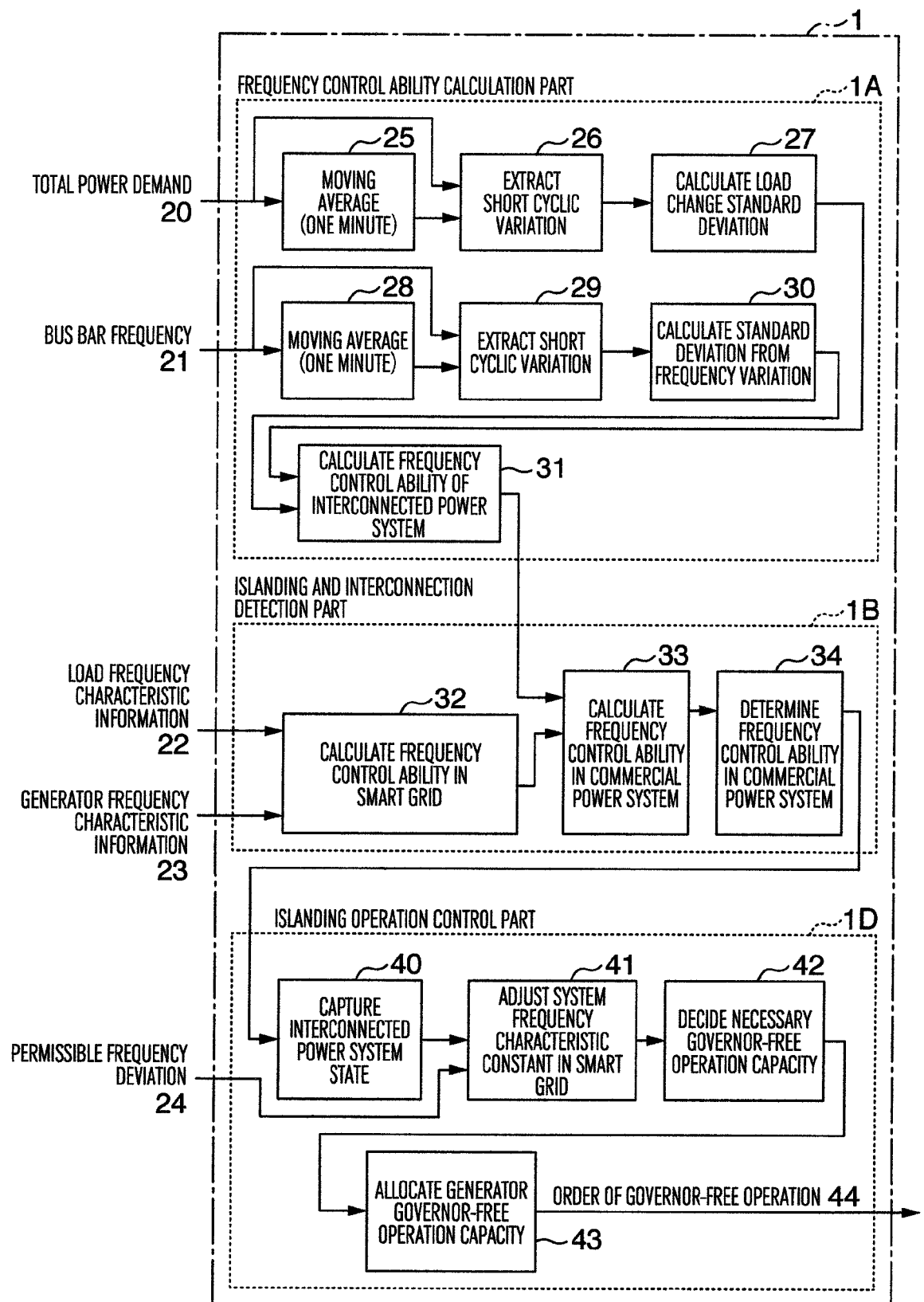
FIG. 9 is a diagram showing 1A, 1B and 1D of the supervisory control equipment for smart grids.

FIG. 9 is a block diagram showing the functions 1A, 1B and 1D of the supervisory control equipment 1 for smart grids. Among them, the functions 1A and 1B have been described above, so that the islanding operation control part 1D is described below.

According to the judged result of the determination part 34 of frequency control ability in interconnected commercial power system of the islanding and interconnection control part 1B, the islanding operation control part 1D is driven to operate when it is judged as the islanding operation, takes in the conditions by a capture part 40 of interconnected power system state and starts the following processing.

The operation performed by the islanding operation control part 1D is described very briefly. That is, the frequency control ability of the smart grid 2B at the time of islanding operation is decided. In other words, it was determined that the frequency control ability of the smart grid 2B was same as the frequency control ability of the commercial power system at the time of the linkage operation, but since then, the operation can be made in the range of self-responsibility of the smart grid 2B, so that a change is made to operate suitable for the smart grid 2B.

Specifically, the frequency characteristic constant in smart grid is adjusted by an adjusting part 41 of system frequency characteristic constant in smart grid according to a permissible frequency variation 24 of the single smart grid. A calculation part 42 of necessary governor-free operation capacity decides necessary governor-free operation capacity in smart grid according to the output of the adjusting part 41 of system frequency characteristic constant in smart grid. And, the generator frequency characteristic constant $K_{GS}$ in smart grid is adjusted to realize a necessary frequency characteristic constant. In addition, an allocation part 43 of generator governor-free operation capacity decides an addition or reduction of a governor-free operation generator according to the necessary governor-free operation capacity.

To operate in the range of self-responsibility of the smart grid 2B, the permissible frequency variation 24 of the single smart grid is set larger, so that the governor-free operation capacity can be decreased by allowing the frequency deviation. This operation is determined appropriately depending on the circumstances in the smart grid 2B.

Figure 10:
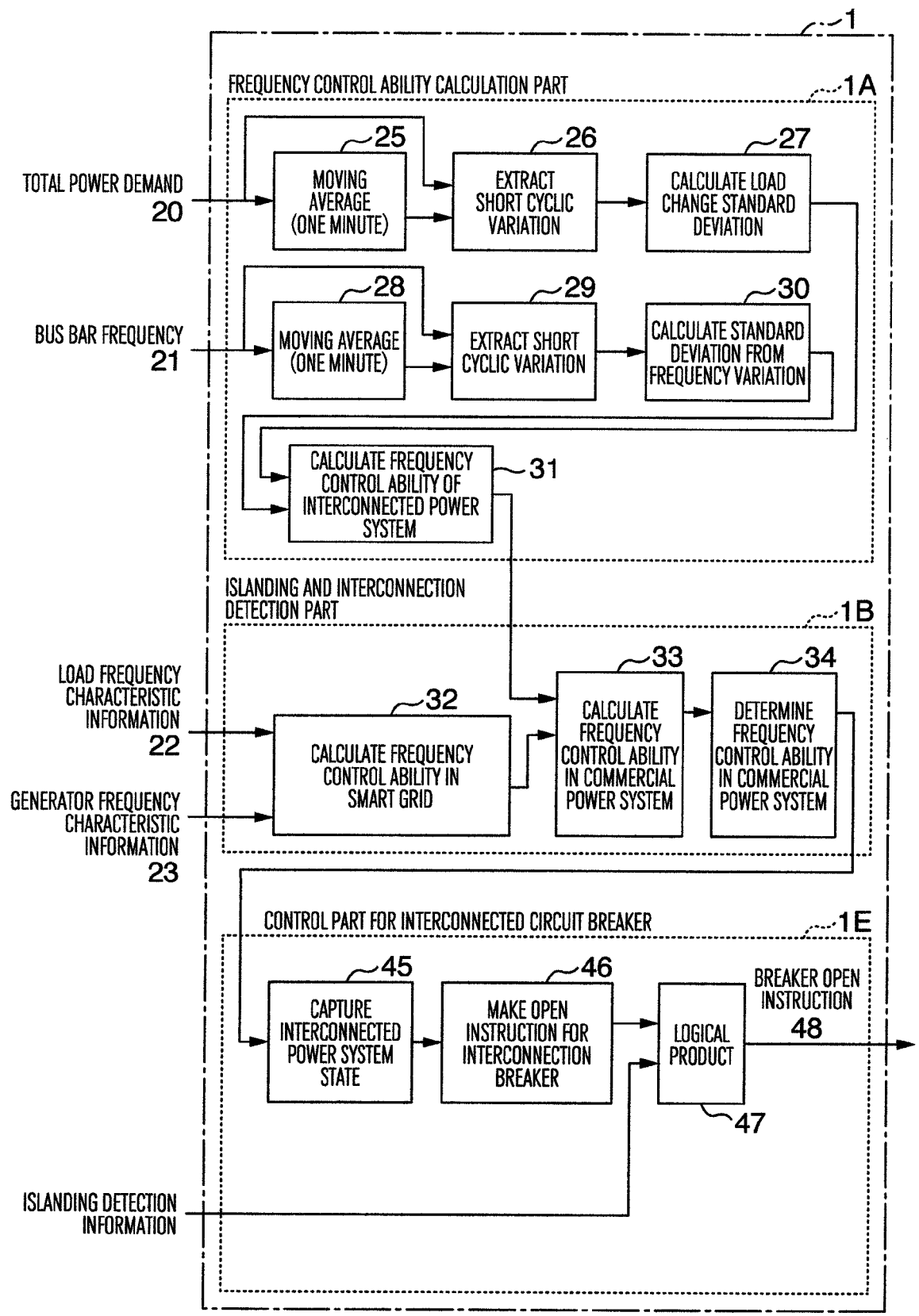
FIG. 10 is a diagram showing 1A, 1B and 1E of the supervisory control equipment for smart grids.

FIG. 10 is a block diagram showing the functions 1A, 1B and 1E of the supervisory control equipment 1 for smart grids. Among them, the functions 1A and 1B have been described above, so that the control part 1E for interconnected circuit breaker is described below. The function of the control part 1E for interconnected circuit breaker is described very briefly. It detects the shifting to the islanding operation and trips the interconnection circuit breaker 77.

Even when the commercial power system 2A is cut off due to a failure in the commercial power system 2A in FIG. 1, a part of the distribution system occasionally remains in a state connected to the smart grid 2B. Since the remained distribution system is not under responsible control of the smart grid 2B, it is necessary to open the interconnection circuit breaker 77 to separate. Therefore, the function of the control part 1E for interconnected circuit breaker is provided.

Therefore, when the judgment by the determination part 34 of frequency control ability in interconnected commercial power system was the islanding operation, the control part 1E for interconnected circuit breaker takes in islanding operation judging conditions by a capture part 45 of interconnected power system state, and performs the tripping process of the interconnected circuit breaker. But, this method following the judgment of the determination part 34 of frequency control ability in interconnected commercial power system desirably outputs a final circuit breaker open instruction 48 by a logical product 47 with the output of islanding operation detection method of the active type to detect the islanding operation of the passive type. As the islanding operation detection method according to the active type, there is one described in Japanese Patent No. 3367371.

The present invention can be configured of simple equipment, so that it can be used extensively as the supervisory control equipment for smart grids.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A supervisory control method for smart grids which comprise a plurality of generators and loads and are operated in interconnection with a commercial power system, comprising:
    calculating frequency control ability of the commercial power system; and
    discriminating between an interconnection operation and an islanding operation according to the magnitude of the frequency control ability;
    wherein the frequency control ability is calculated as a ratio between a time-series standard deviation of a system load short cyclic variation and a time-series standard deviation of a system frequency short cyclic variation.

2. The supervisory control method for smart grids according to claim 1, wherein when it is discriminated that the commercial power system is interconnected with the smart grids, a generator governor-free operation capacity in the smart grids is adjusted according to the frequency control ability of the commercial power system.

3. The supervisory control method for smart grids according to claim 2, wherein the commercial power system and the smart grid are compared for the frequency control ability, and the generator governor-free operation capacity in the smart grid is adjusted to conform the frequency control ability of the smart grid to the frequency control ability of the commercial power system.

4. The supervisory control method for smart grids according to claim 1, wherein when it is discriminated that the smart grid is in the islanding operation, the governor-free operation capacity is determined according to a permissible frequency variation of the smart grid.

5. The supervisory control method for smart grids according to claim 1, wherein when it is discriminated according to a change in the frequency control ability of the commercial power system that the smart grid is in the islanding operation, an open instruction is given to a circuit breaker interconnected between the commercial power system and the smart grid.

6. The supervisory control method for smart grids according to claim 5, wherein when it is discriminated according to the change in the frequency control ability of the commercial power system that the smart grid is in the islanding operation and the discriminated result of an active type islanding operation determination unit matches, the open instruction is given to the circuit breaker interconnected between the commercial power system and the smart grid.

7. The supervisory control method for smart grids according to claim 1, wherein the frequency control ability for discriminating between the interconnection and islanding operations according to the magnitude of the frequency control ability is determined to be frequency control ability of the system that the commercial power system and the smart grids are interconnected.

8. Supervisory control equipment for smart grids provided with a plurality of generators and loads and operated in interconnection with a commercial power system through an interconnected circuit breaker, comprising:
    a frequency control ability calculation part for calculating the frequency control ability of the interconnected system by using a total power demand and a bus bar frequency; and
    an islanding and interconnection detection part for calculating frequency control ability of the commercial power system according to the frequency control ability of the system of the frequency control ability calculation part to discriminate between the interconnected and islanding operations according to the magnitude of the frequency control ability;
    wherein the frequency control ability calculation part calculates the frequency control ability as a ratio between a time-series standard deviation of a system load short cyclic variation and a time-series standard deviation of a system frequency short cyclic variation.

9. The supervisory control equipment for smart grids according to claim 8, further comprising a cooperated operation control part that adjusts the generator governor-free operation capacity in the smart grids according to the frequency control ability of the commercial power system when it is discriminated as an interconnected operation by the islanding and interconnection detection part.

10. The supervisory control equipment for smart grids according to claim 9, wherein the islanding and interconnection detection part calculates the frequency control ability of the commercial power system and the smart grids, and the cooperated operation control part adjusts the generator governor-free operation capacity in the smart grids to conform the frequency control ability of the smart grid to the frequency control ability of the commercial power system.

11. The supervisory control equipment for smart grids according to claim 8, further comprising an islanding operation control part that determines the governor-free operation capacity according to a permissible frequency variation of the smart grids when it is discriminated as an islanding operation by the islanding and interconnection detection part.

12. The supervisory control equipment for smart grids according to claim 8, further comprising a control part for interconnected circuit breaker that gives an open instruction to the interconnected circuit breaker between the commercial power system and the smart grids when it is discriminated as an islanding operation by the islanding and interconnection detection part.

13. The supervisory control equipment for smart grids according to claim 12, wherein the control part for interconnected circuit breaker gives an open instruction to the interconnected circuit breaker between the commercial power system and the smart grids when it is discriminated as the islanding operation by the islanding and interconnection detection part and the discriminated result of an active type islanding operation determination unit matches.

* * * * *